Patented Feb. 11, 1930

1,746,651

UNITED STATES PATENT OFFICE

WINFRID HENTRICH AND MAX HARDTMANN, OF WIESDORF-ON-THE-RHINE, GERMANY, ASSIGNORS TO GENERAL ANILINE WORKS, INC., OF NEW YORK, N. Y., A CORPORATION OF DELAWARE

DYESTUFFS WHICH ARE COMPLEX COPPER-AMMINE COMPOUNDS

No Drawing. Original application filed December 9, 1926, Serial No. 153,723, and in Germany December 12, 1925. Divided and this application filed October 18, 1927. Serial No. 227,054.

The present invention relates to new copper-containing azo dyestuffs and to a process of preparing the same. More particularly, it relates to compounds of the general formula:

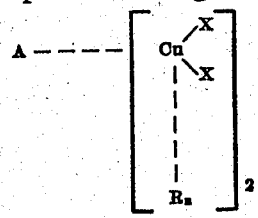

wherein A represents a disazo dyestuff molecule containing in ortho-position to each azo group a substituent of the group comprising the hydroxyl-, the carboxyl-, and the carbonyl groups, X represents hydroxyl, a monovalent acid group such as -Cl, $CH_3COO$-, etc., or both X's together represent a divalent acid group such as $=SO_4$, R represents a molecule of the ammonia type or of the aquo ($H_2O$) type, but at least one R being a molecule of the ammonia type, $n$ represents the number 3 or 5.

Our preferred process for producing our new compounds consists in effecting the manufacture of the azo dyestuffs in question, which may consist, for instance, in diazotizing an aromatic amine containing a hydroxyl-, carboxyl-, or a carbonyl group in ortho-position to the diazo compound, and coupling the diazo compound thus obtained with any desired coupling component, in the presence of a complex copper-ammine compound of the general formula:

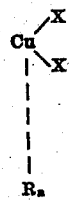

wherein X and R represent the same as above and $n$ represents the number 4 or 6, and in the presence of a weakly alkaline neutralizing agent, such as sodium carbonate or aqueous ammonia.

However, in certain instances, it is also possible to produce our new compounds by causing a water-soluble copper-ammine compound to react with the finished azo dyestuff.

The chemical constitution of our new complex dyestuffs is not perfectly known. From their mode of formation and their chemical behavior the above given formula seems to be the best possible one. We wish it to be understood that the expression "molecules of the ammonia type," as used in the specification, and in the claims, includes ammonia as well as methyl-amine, ethylenediamine, pyridine, glycocoll, etc.

The copper-ammine compounds which we have found useful and tried out in our new process can be exemplified by the following:

tetrammine-cupri sulfate $[Cu(NH_3)_4]SO_4$;
tetrammine-cupri hydroxyde:

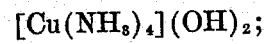
$[Cu(NH_3)_4](OH)_2$;

hexammine-cupri chloride: $[Cu(NH_3)_6]Cl_2$;
triethylenediamine-cupri sulfate:

$[Cu(H_2N-CH_2-CH_2-NH_2)_3]SO_4$ triethylenediamine-cupri chloride:

$[Cu(H_2N-CH_2-CH_2-NH_2)_3]Cl_2$ in both of which latter formulæ the ethylenediamine molecule, often represented herein by the symbol "en", acts like two ammonia type molecules; hexa pyridine-cupri-bromide: $[Cu(C_5H_5N)_6]Br_2$; tetra pyridine-cupri-acetate: $[Cu(C_5H_5N)_4](CH_3COO)_2$; tetra quinoline-cupri-chloride:

$[Cu(C_9H_7N)_4]Cl_2$;

tetra trimethyl-amine-cupri sulfate:

$[Cu(N(CH_3)_3)_4]SO_4$ tetra monomethylamine cupri sulfate:

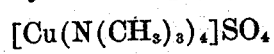
$Cu≡≡≡(NH_2CH_3)_4 = SO_4$; the glycocoll compound of the formula:

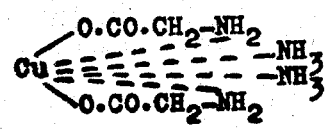

diethylenediamine-di-aquo-cupri chloride:

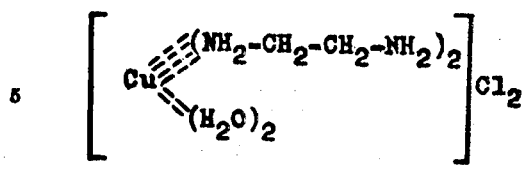

The applicability of our invention in new copper-ammino-azo dyestuffs is an exceedingly wide one and permits of numerous variations also in the choice of the azo dyestuff components as well as in the procedure of promoting the reaction between these components and the copper-ammine complex compound.

In the case of tetrazo compounds, substituted in ortho position to both diazo groups by hydroxyl, carboxyl or carbonyl groups, the disazo dyestuffs produced from them react usually with two molecular proportions of a copper-ammine compound.

Our new complex-copper-ammine-azo dyestuffs are obtained by our process directly in substantially pure form and can be used as such for dyeing purposes. They are, when made from sulfonated intermediates, usually water soluble, and due to the possibility of applying our new reaction to a very large range of azo dyestuff components, practically all possible shades and dyeing properties are obtainable and the dyestuffs are liable to be used for all kinds of dyeing purposes.

It goes without saying that this new class of complex copper - ammine - azo - dyestuffs comprises also such dyestuffs which contain a free amino group. These, when applied for instance to the fibre, can be further diazotized and coupled with any desired coupling compound.

Similarly it is also possible to diazotize on the fibre suitable azo dyestuffs containing no copper, but one or more diazotizable amino groups and to couple same with suitable coupling compounds in the presence of a copper-ammine complex, or particularly with such coupling compounds which, themselves, are capable of forming complex copper-ammine-azo compounds.

In cases where the new copper-ammine-azo dyestuffs contain in ortho position to a hydroxyl group a hydrogen atom capable of reacting with a diazo compound, dyeings of such dyestuffs can also be developed on the fibre with the usual developing diazo compounds, such as for instance p-nitro-diazo-benzene, etc.

By the usual methods for splitting up azo dyestuffs by reduction, our new products yield a cuprous salt, a nitrogen base of the ammonia type, usually in form of a salt, the original aromatic amine and an amino derivative of the coupling compound.

The following examples will further illustrate our invention, the parts being by weight:

*Example 1.*—350 parts tetrammine-cuprisulfate: $[Cu(NH_3)_4]SO_4 + H_2O$ dissolved in cold water are added to an aqueous solution containing 502 parts 5-5'-dihydroxy-2-2'-dinaphthylurea-7-7'-disulfonic acid and 700 parts soda ash. A suspension of the diazo compound obtained in the usual manner from 374 parts 2-amino-naphthalene-3-carboxylic acid is then run into the above clear solution. The coupling and formation of the complex cupri-ammine-azo dyestuff start immediately and both reactions are quickly completed. The product is salted out by the addition of some sodium chloride, then filtered off and dried. It is soluble in water with a bluish-red color and in concentrated sulfuric acid with a bluish-violet color. Upon reduction with stannous chloride in hydrochloric acid solution, it is split up into 2-amino-naphthalene-3-carboxylic acid, 6-6'-diamino-5-5'-dihydroxy-2-2'-dinaphthylurea-7-7'-disulfonic acid, cuprous chloride and ammonium chloride. It dyes cotton by the usual dyeing methods very fast bluish-red shades. This complex cupri-ammine-azo dyestuff has most probably the formula:

wherein A stands for the disazo dyestuff of the formula:

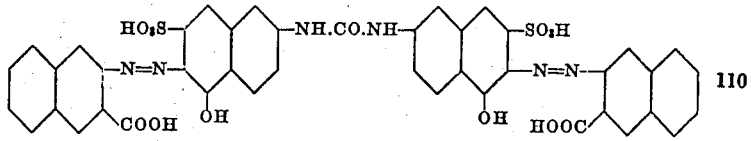

We have found that two of the $NH_3$ molecules attached by auxiliary valencies to each of the copper atoms can be replaced, without departing from the spirit of our invention, by aquo rests ($H_2O$). The third $NH_3$ molecule is, however, essential for the production of the desired result. This is equally true for all complex cupri-ammine-azo dyestuffs prepared according to our invention and particularly so for the formula given in the examples below.

The soda ash used as neutralizing agent in this example can be replaced by aqueous ammonia with the same result. Dyestuffs of similar properties are obtained by substituting the tetrammine-cupri sulfate of this example by tetra-trimethylammine-cupri sulfate:

[Cu(N(CH₃)₃)₄]SO₄+H₂O; tetra-pyridine-cupri acetate:

[Cu(C₅H₅N)₄](CH₃COO)₂; hexammine-cupri chloride:

[Cu(NH₃)₆]Cl₂ or diethylene-diamine-di-aquo-cupri chloride:

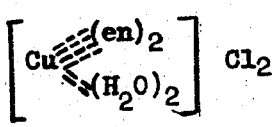

(en) standing for an ethylene-diamine molecule. The formulæ of these dyestuffs are correspondingly similar.

*Example 2.*—137 parts 2-amino-benzoic acid are diazotized in the usual manner. In the meantime 461 parts 5-5'-dihydroxy-2-2'-dinapthylamine-7-7'-disulfonic acid and 770 parts soda ash are dissolved in 8750 parts water and a solution of diethylene-diamine-di-aquo-cupri sulfate of the formula:

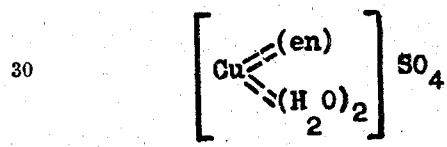

(en) standing for an ethylene-diamine molecule, prepared from 490 parts crystallized copper sulfate, according to Werner, Zeitsch. f. anorg. Chem., vol. 21, page 233 (1899), is added. The above diazo solution is then added with cooling to this clear bluish solution of the 5-5'-dihydroxy-2-2'-dinaphthyl-amine-7-7'-disulfonic acid. The reaction mass is heated for some time to 30–40° C. to complete the formation of the dyestuff, which is then salted out, filtered off, washed and dried. It has most probably the formula:

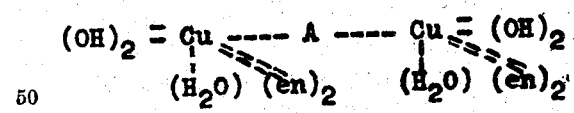

wherein A stands for the disazo dyestuff of the formula:

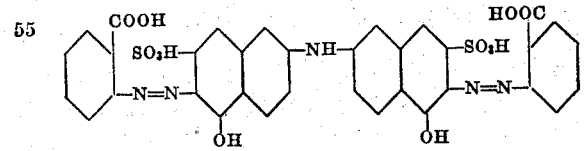

It is soluble in water with a bluish-red and in concentrated sulfuric acid with a violet color, and dyes cotton bluish-red shades. It yields on reduction with stannous chloride and hydrochloric acid 2-amino-benzoic acid, 6-6'-diamino-5-5'-dihydroxy-2-2'-dinaphthylamine-7-7'-disulfonic acid, cuprous chloride and ethylene-diamine hydrochloride.

*Example 3.*—The tetrazo compound obtained from 350 parts 4-4'-diamino-diphenylurea-3-3'-dicarboxylic acid is coupled in acetic acid solution with 315 parts 2-phenyl-amino-5-naphthol-7-sulfonic acid. The solution is made distinctly alkaline, after the coupling is complete, then an already prepared solution of tetrammine-cupri sulfate, prepared from 700 parts crystallized copper sulfate and about 1340 parts 20% aqueous ammonia, and finally a concentrated aqueous solution of 2-acetyl-amino-5-hydroxynaphthalene-7-sulfonic acid, are added. The reaction mass is stirred for some time, the temperature being increased at the end to about 30–40° C.; the dyestuff is then isolated in the usual manner, and has probably the formula:

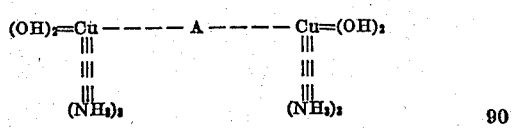

wherein A stands for the disazo-dye of the formula:

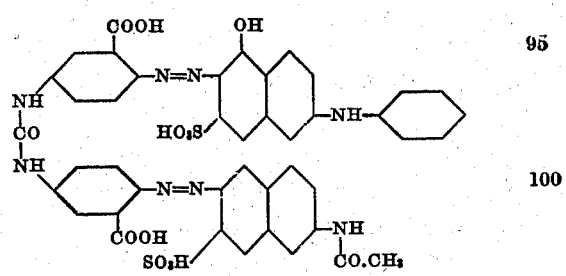

The so obtained complex cupri-ammine-azo dyestuff dyes cotton clear, violet shades of very good fastness to light, alkali and acid. The 2-acetyl-amino-5-naphthol-7-sulfonic acid used in this example can be replaced by the isomer 2-acetylamino-8-naphthol-6-sulfonic acid, or the 1-acetyl-, respectively 1-benzoyl-amino-8-naphthol-3-6-disulfonic acid, complex cupri-ammine-azo dyestuffs having similar properties and dyeing similar shades are so obtained.

*Example 4.*—330 parts 4-4'-diamino-diphenylurea-3-3'-dicarboxylic acid are tetrazotized and coupled at ordinary temperature with an aqueous solution of 704 parts 2-phenyl-amino-5-hydroxynaphthalene-7-sulfonate of sodium containing 700 parts soda ash and 350 parts tetrammine-cupri sulfate. The complex cupri-ammine-azo dyestuff formed is isolated in the usual manner. It has probably the formula:

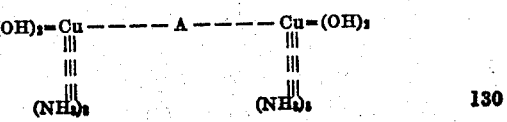

wherein A stands for the diazo dyestuff of the formula:

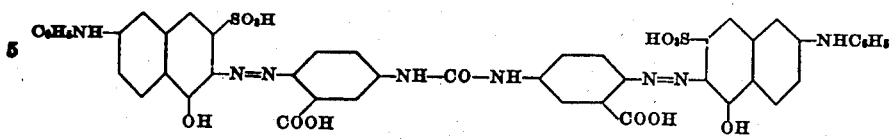

finally the cupri-ammine-azo complex is treated with phosgen.

The novel product is soluble in water with a strongly bluish-red and in concentrated sulfuric acid with a bluish-red color. It dyes cotton fast reddish-violet shades. Reduction with stannous chloride and hydrochloric acid yields 4-4'-diamino-diphenylurea-3-3'-dicarboxylic acid, 2-phenylamino-6-amino-5-hydroxy-naphthalene-7-sulfonic acid, cuprous chloride and ammonium chloride.

Tetrazotized benzidine-3-3'-dicarboxylic acid coupled with 2 molecular proportions of 1-naphthol-4-sulfonic acid in the presence of cupri-ammines, such as diethylenediamine-di-aquo-cupri sulfate of the formula:

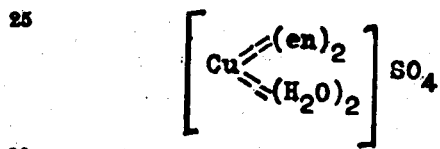

or tetra-mono-methylamino-cupri sulfate:

produces cupri-ammine-azo dyestuffs of similar constitution. It is in a like manner possible to introduce similar azo dyestuff molecules into a pyridine-copper ammine, such as tetra-pyridine-cupri chloride:

whereby corresponding cupri-ammine-azo dyestuffs are obtained.

The 2-phenylamino-5-hydroxynaphthalene-7-sulfonic acid, used in the example above can be partly or entirely replaced by other naphthol-sulfonic acids or derivatives thereof, such as 2-amino-5-hydroxynaphthalene-7-sulfonic acid, 1-ethoxy-8-hydroxynaphthalene-3-6-disulfonic acid, 1-acetyl-amino-8-hydroxynaphthalene-3-6-disufonic acid, etc., whereby similar products are obtained.

A dyestuff, quite similar to the one described in the present example, can be obtained as follows: 5-nitro-2-amino-benzoic acid is coupled in alkaline solution with 2-phenylamino-5-hydroxynaphthalene-7-sulfonic acid in the presence of tetrammine-cupri sulfate. The nitro group contained in the so obtained cupri-ammine-amino-azo complex is then reduced in the well known manner by means of an alkali sulfide and finally the cupri-ammine-azo complex is treated with phosgen.

*Example 5.*—242 parts 2-amino-benzaldehyde, or the corresponding amount of its anhydro form are diazotized. The diazo-compound is run at $-5°$ C. into an aqueous solution of 461 parts 5-5'-dihydroxy-2-2'-dinaphthyl-amine-7-7'-disulfonic acid, containing 1000 parts soda ash and 1800 parts tetrammine-cupri sulfate. The solution turns a claret-red color and the coupling, which readily takes place is soon finished. The dyestuff precipitates and is filtered off, washed out and dried as usual. It is soluble in water with a bluish-red and in concentrated sulfuric acid with a violet color. It dyes cotton strongly bluish-red shades of very good fastness to light. It has most probably the formula:

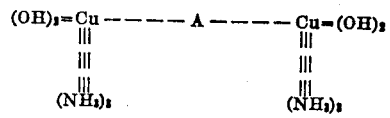

wherein A stands for the disazo dyestuff of the formula:

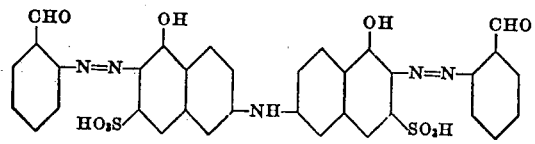

This treatment with a cupri-ammine complex stabilizes in this particular case the azo dyestuff obtained from ortho-amino-benzaldehyde which heretofore had only been possible by a treatment with hydroxylamine as disclosed in the U. S. application Serial No. 74,163, filed by one of us in conjunction with other inventors on Dec. 7, 1925.

Similar dyestuffs are also obtained if 2-amino-1-hydroxy-benzene or its derivatives are substituted for the 2-amino-benzaldehyde of the examples above.

This is a division of our application Serial No. 153,723, filed on December 9, 1926.

We claim:

1. As a new product the complex cupri-ammine-azo dyestuff of the probable formula:

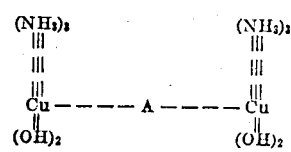

wherein A stands for the disazo dyestuff of the formula:

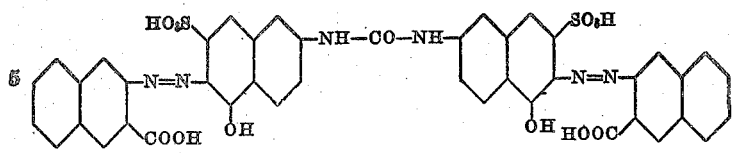

which is soluble in water with a bluish-red color and in concentrated sulfuric acid with a bluish-violet color, and which dyes cotton very fast bluish-red shades.

2. As new products the complex cupri-ammine-azo dyestuffs of the probable general formula:

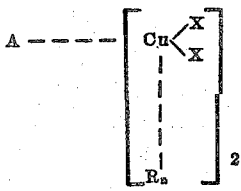

wherein A represents a disazo dyestuff molecule containing in ortho-position to each azo group a substituent of the group comprising the hydroxyl-, the carboxyl-, and the carbonyl groups, X represents hydroxyl or a monovalent acid group, or both X's together represent a divalent acid group, R represents a molecule of the ammonia type or of the aquo ($H_2O$) type, but at least one R being a molecule of the ammonia type, and $n$ represents the number 3 or 5.

3. As new products the complex cupri-ammine-azo dyestuffs of the probable general formula:

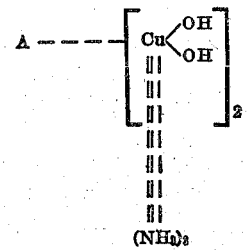

wherein A stands for a disazo dyestuff molecule containing in ortho-position to each azo group a substituent of the group comprising the hydroxyl-, the carbonyl-, and the carboxyl group.

In testimony whereof we have hereunto set our hands.

WINFRID HENTRICH.
MAX HARDTMANN.